(12) United States Patent
Nomura

(10) Patent No.: US 8,021,622 B2
(45) Date of Patent: Sep. 20, 2011

(54) HEAT INSULATING CONTAINER

(75) Inventor: Masatoshi Nomura, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 1047 days.

(21) Appl. No.: 11/895,980

(22) Filed: Aug. 28, 2007

(65) Prior Publication Data

US 2008/0070089 A1 Mar. 20, 2008

(30) Foreign Application Priority Data

Sep. 19, 2006 (JP) ................... 2006-253015

(51) Int. Cl.
*B01J 19/00* (2006.01)
(52) U.S. Cl. ............. 422/198; 422/211; 48/61; 429/19; 429/20; 429/34; 429/35; 220/592.21
(58) Field of Classification Search ............ 422/190, 422/198, 193; 48/127.9, 61; 429/34–35
See application file for complete search history.

(56) References Cited

U.S. PATENT DOCUMENTS

| 2002/0150532 A1* | 10/2002 | Grieve et al. ............. 423/650 |
| 2004/0148858 A1 | 8/2004 | Yamamoto et al. |
| 2005/0069737 A1 | 3/2005 | Nomura et al. |
| 2005/0205798 A1* | 9/2005 | Downing et al. ...... 250/390.11 |

FOREIGN PATENT DOCUMENTS

| JP | 04-087267 | 3/1992 |
| JP | 2003-151595 | 5/2003 |
| JP | 2004-006265 | 1/2004 |
| JP | 2004-356003 A | 12/2004 |
| JP | 2005-108557 | 4/2005 |

OTHER PUBLICATIONS

Japanese Office Action (and English translation thereof) dated Sep. 30, 2008, issued in a counterpart Japanese Application.
Japanese Office Action dated Jan. 20, 2009 (2 pages), and English translation thereof (3 pages) issued in counterpart Japanese Application No. 2006-253015.

* cited by examiner

*Primary Examiner* — Kaity V. Handal
(74) *Attorney, Agent, or Firm* — Holtz, Holtz, Goodman & Chick, PC (57) ABSTRACT

Disclosed is a heat insulating container, including a heat source, a housing that houses the heat source therein and a temperature detection unit that is formed on a surface of the housing and reflects radiation.

17 Claims, 11 Drawing Sheets

Fig. 14

HEAT INSULATING CONTAINER

BACKGROUND OF THE INVENTION

1. Field of the Invention

The present invention relates to a heat insulating container, and particularly to a heat insulating container that is applicable to a reaction device which generates hydrogen from fuel and water.

2. Description of the Related Art

In recent years, in order to mount a fuel cell, which serves as a clean power supply having high energy conversion efficiency, on an automobile, a cellular phone, or the like, development of the fuel cell and relative technologies thereof has been proceeded. The fuel cell is a device that makes fuel and oxygen in the atmosphere go under electrochemical reaction with each other, and then directly extracts electric energy from chemical energy.

With respect to a reforming-type fuel cell that reforms fuel such as alcohols and gasoline, and uses the reformed fuel at the fuel cell, the fuel can be easily stored in a liquid state. Concerning the fuel cell as described above, a reaction device is required to include a vaporizer that vaporizes the liquid fuel and water; a reformer that takes out the hydrogen necessary to generate power, the hydrogen being generated by reacting the vaporized fuel with high-temperature vapor; a carbon monoxide remover that removes carbon monoxide which is a byproduct of the reforming reaction; and the like.

A variety of countermeasures have been taken in order to allow the reaction device operate at a high temperature, and to enhance heat utilization efficiency. For example, as described in Japanese Patent Application Publication (Laid open) No. 2004-35603, a thin-film heater is provided to a body of the reaction device that makes fluids in flow passages go under chemical reaction, a reaction device body is housed in a heat insulating package having a reflection film formed on inner surface thereof, and inside of the heat insulating package is under reduced pressure. Since the inside of the heat insulating package is in the reduced-pressure state, heat of the thin-film heater is less likely to transfer to outside of the reaction device. Accordingly, the heat of the thin-film heater is efficiently used by the reaction device body.

Incidentally, when a gas leak occurs in the heat insulating package and the like, and when temperature of the reaction device body becomes high, temperature of the heat insulating package itself becomes high, and peripheral devices of the reaction device are affected by the heat of the heat insulating package. In such case, operation of the reaction device is sometimes stopped rapidly. However, since a temperature sensor is not provided to the heat insulating package, it is impossible to monitor whether or not the temperature of the heat insulating package is high, by measuring the temperature of the heat insulating package itself.

The present invention has an advantage in that it is possible to monitor the temperature of the heat insulating package including a heat source such as the reaction device body. In order to obtain such advantage, a heat insulating container according to the present invention comprises:

a heat source;

a housing that houses the heat source therein; and a temperature detection unit that is formed on a surface of the housing and reflects radiation.

In addition, the power generation apparatus according to the present invention comprises:

a reaction device body that generates hydrogen from fuel and water;

a housing that houses the reaction device body therein;

a temperature detection unit that is formed on a surface of the housing and reflects radiation; and a power generation cell that generates power by using the hydrogen generated by the reaction device body.

Further, an electronic equipment according to the present invention comprises:

a power generation apparatus including:

a reaction device body that generates hydrogen from fuel and water;

a housing that houses the reaction device body therein;

a temperature detection unit that is formed on a surface of the housing and reflects a radiation; and a power generation cell that generates power by using the hydrogen generated by the reaction device body.

BRIEF DESCRIPTION OF THE SEVERAL VIEWS OF THE DRAWING

The present invention will become more fully understood from the detailed description given below and the accompanying drawings; however, these description and drawings are given by way of illustration only, and do not limit the scope of the present invention, wherein.

DETAILED DESCRIPTION OF THE INVENTION

Best Mode for Carrying Out the Invention

Hereinafter, best mode for carrying out the present invention will be described with reference to drawings. Though a variety of technically preferable limitations for carrying out the present invention are provided in the embodiments described below, the scope of the present invention is not limited to the following embodiments and illustrated examples.

First Embodiment

[Power Generation Apparatus Using a Reaction Device]

Figure 1:
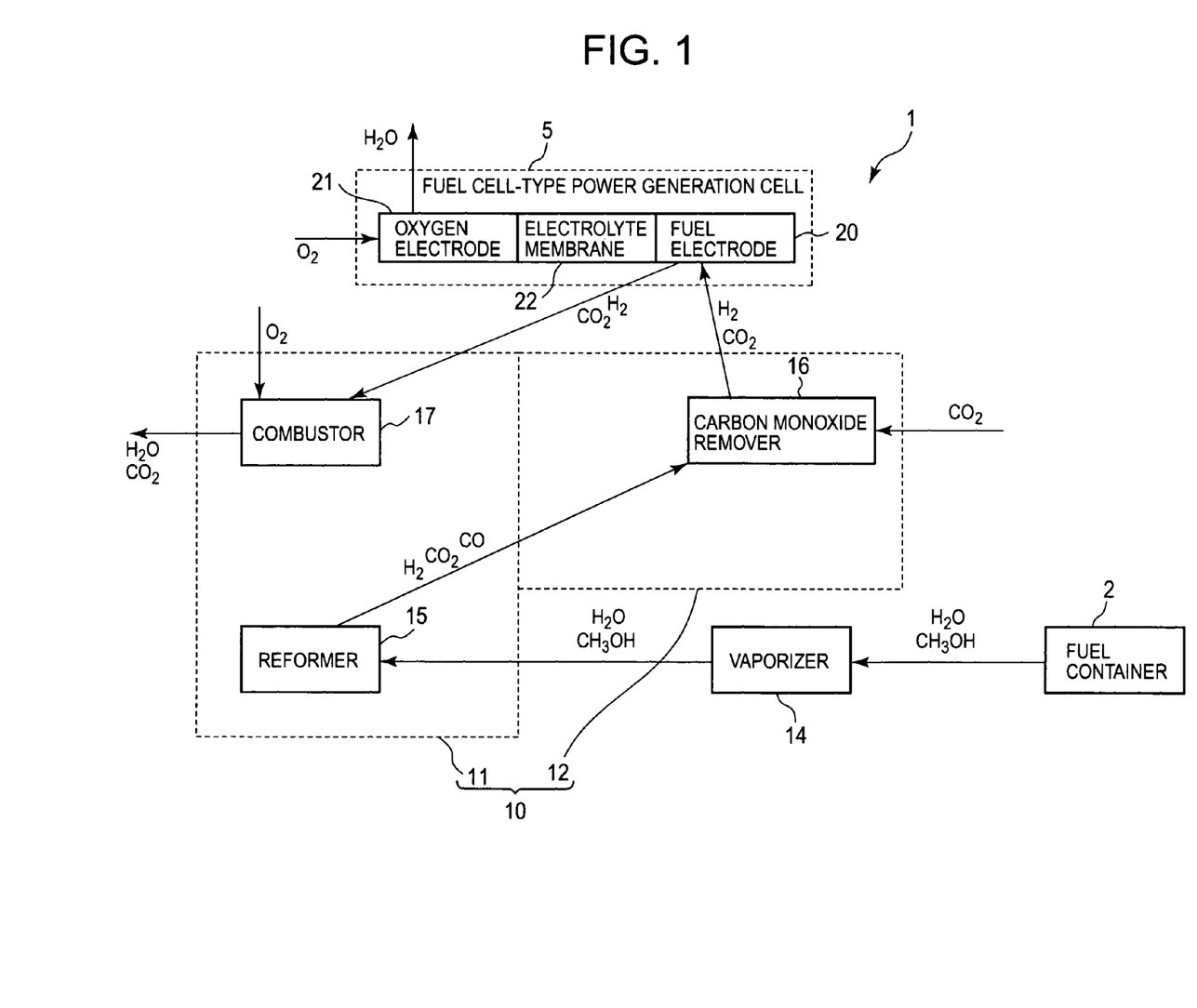
FIG. 1 is a block diagram showing a power generation apparatus using a reaction device according to a first embodiment of the present invention.

FIG. 1 is a block diagram of a power generation apparatus 1 using a reaction device (heat insulating container) 10 to which the present invention is applied. This power generation apparatus 1 is equipped, for example, in a notebook personal computer, a cellular phone, a personal digital assistant (PDA), an electronic organizer, a wrist watch, a digital still camera, a digital video camera, a game instrument, a gaming machine, and other electronic equipments. The power generation apparatus 1 is used as a power supply to operate these electronic equipments.

The power generation apparatus 1 includes a fuel container 2, a vaporizer 14, the reaction device 10, and a fuel cell type power generation cell (power generation cell) 5. The reaction device 10 has a high-temperature reaction portion 11 that operates at high temperature ranging in 250 to 400° C., and a low-temperature reaction portion 12 that operates at a lower temperature (90 to 140° C.) than the high-temperature reaction portion 11. The high-temperature reaction portion 11 has a reformer 15 and a combustor 17, and the low-temperature reaction portion 12 has a carbon monoxide remover 16.

In the fuel container 2, fuel (for example, methanol, ethanol, dimethyl ether, butane, and gasoline) and water are reserved separately or in a mixed state. The fuel and the water are supplied in the mixed state to the reaction device 10 by a micro-pump (not shown). Here, in FIG. 1, the fuel in the fuel container 2 is assumed to be the methanol.

The fuel and the water in the fuel container 2 are fed to the vaporizer 14. The fuel and the water are vaporized by the vaporizer 14, and a gaseous mixture of the fuel and the water is fed to the reformer 15. The reformer 15 generates hydrogen gas and the like from the vaporized water and fuel by a catalytic reaction, and also generates trace amount of carbon monoxide gas. In a case where the fuel is the methanol, chemical reactions represented by the following formulas (1) and (2) occur in the reformer 15. Here, the reaction to generate the hydrogen is an endothermic reaction, and uses combustion heat of the combustor 17, and the like.

$$CH_3OH + H_2O \rightarrow 3H_2 + CO_2 \quad (1)$$

$$H_2 + CO_2 \rightarrow H_2O + CO \quad (2)$$

The hydrogen gas and the like, which are generated in the reformer 15, are fed to the carbon monoxide remover 16, and external air is also fed to the carbon monoxide remover 16. The carbon monoxide remover 16 preferentially oxidizes the carbon monoxide, which is generated as a by-product, by a catalyst, and thereby selectively removes the carbon monoxide. Hereinafter, the gaseous mixture from which the carbon monoxide is removed will be referred to as reformed gas. Here, the reaction to oxidize the carbon monoxide is an exothermic reaction.

The fuel cell type power generation cell 5 is composed of a fuel electrode 20, an oxygen electrode 21, and an electrolyte membrane 22 which is sandwiched between the fuel electrode 20 and the oxygen electrode 21. The reformed gas fed from the carbon monoxide remover 16 is supplied to the fuel electrode 20 of the fuel cell type power generation cell 5, and external air is fed to the oxygen electrode 21. Then, the hydrogen in the reformed gas supplied to the fuel electrode 20 goes under electrochemical reaction with oxygen in the air supplied to the oxygen electrode 21, through the electrolyte membrane 22, and thus power is generated between the fuel electrode 20 and the oxygen electrode 21. The fuel electrode 20 and the oxygen electrode 21 are connected to a load (for example, motor, DC-DC converter, secondary battery, and the like), and the load operates by the power taken from the fuel cell type power generation cell 5.

In a case where the electrolyte membrane 22 is a hydrogen ion-permeable electrolyte membrane (for example, solid polymer electrolyte membrane), a reaction represented by the following formula (3) occurs at the fuel electrode 20, hydrogen ions generated at the fuel electrode 20 permeate through the electrolyte membrane 22, and a reaction represented by the following formula (4) occurs at the oxygen electrode 21.

$$H_2 \rightarrow 2H^+ + 2e^- \quad (3)$$

$$2H^+ + 1/2O_2 + 2e^- \rightarrow H_2O \quad (4)$$

Off-gas such as hydrogen gas that remains without going under the electrochemical reaction at the fuel electrode 20 is fed to the combustor 17. External air is fed to the combustor 17. The combustor 17 mixes the hydrogen in the off-gas and oxygen with each other, and combusts an obtained air-fuel mixture by the catalytic reaction.

[Specific Configuration of Reaction Device]

Figure 2:
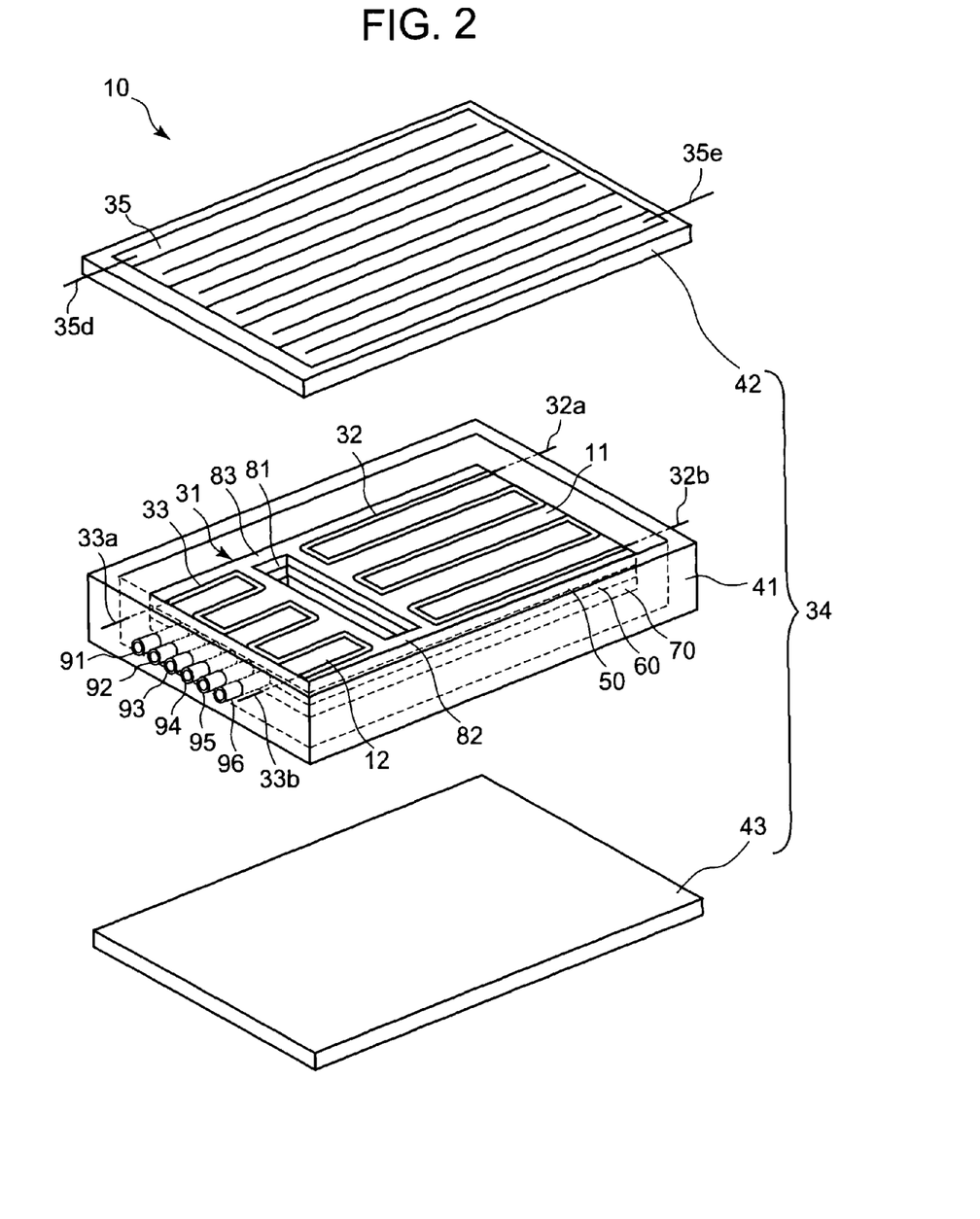
FIG. 2 is a perspective view showing a state where the reaction device according to the first embodiment of the present invention is exploded.

Next, description will be made with respect to specific configuration of the reaction device 10. FIG. 2 is an exploded perspective view of the reaction device 10.

As shown in FIG. 2, the reaction device 10 includes a reaction device body (heat source) 31 that generates the hydrogen from the fuel and the water, thin-film heaters (heating units) 32 and 33 formed on a surface of the reaction device body 31, a heat insulating package (housing) 34 that houses the reaction device body 31 and the thin-film heaters 32 and 33 therein, a thin-film temperature sensor (temperature detection unit) 35 formed on a surface of the heat insulating package 34, a monitoring circuit 36 (shown in FIG. 9) that monitors the thin-film heaters 32 and 33 and the thin-film temperature sensor 35.

[Heat Insulating Package]

The heat insulating package 34 includes a rectangular frame body 41, and lid members 42 and 43 which seal openings of the frame body 41 so as to sandwich the frame body 41 therebetween. The frame body 41 and the lid members 42 and 43 are formed with a heat insulating material such as glass or a metal material such as stainless steel. he frame body 41 and the lid members 42 and 43 are formed with the same material. Since a temperature difference occurs between the high-temperature reaction portion 11 and the low-temperature reaction portion 12 as will be described later, degree of vacuum of inside the heat insulating package 34 is set as high so as to reach a desired value. On an inner surface of the heat insulating package 34, a radiation reflection film 34a (shown in FIG. 3), such as aluminum, gold, silver, and copper that reflects a radiation, is formed. Heat rays/electromagnetic waves emitted from the reaction device body 31 and the thin-film heaters 32 and 33 are reflected by the radiation reflection film 34a. By such reflection, heat loss caused by the radiation is suppressed. Here, when the radiation reflection film 34a is gold, and the heat insulating package 34 is glass, adhesion of the radiation reflection film 34a onto the heat insulating package 34 can be enhanced by using chromium or titanium as a base. Further, when the lid members 42 and 43 of the heat insulating package 34 have electrical conductivity, an electrically insulating film is formed on the surface of the heat insulating package 34, and then the thin-film temperature sensor 35 is formed on the electrically insulating film.

[Temperature Sensor]

The thin-film temperature sensor 35 is formed on either one or both of an upper surface of the heat insulating package 34 (a surface of the lid member 42) and a lower surface of the heat insulating package 34 (a surface of the lid member 43). The thin-film temperature sensor 35 is formed in a zigzag shape by a vapor deposition method, a photolithography method, an etching method, and the like.

Figure 3:
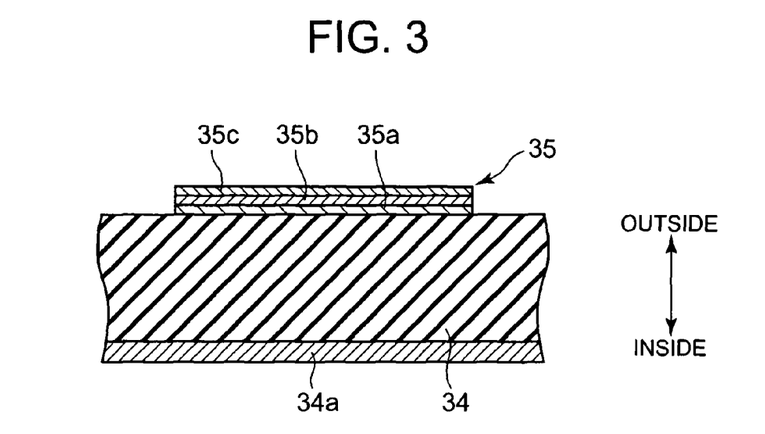
FIG. 3 is a partial cross-sectional view of a heat insulating package of the reaction device.

As shown in FIG. 3, the thin-film temperature sensor 35 is formed by stacking, in order from below, an adhesion layer (first adhesion layer) 35a, a diffusion prevention layer (first diffusion prevention layer) 35b, and a resistor layer (first resistor layer) 35c. The adhesion layer 35a is formed of a material (for example, at least one of Ta, Mo, Ti, Cr, and TiN) having adhesion property to the surface of the heat insulating package 34. By this adhesion layer 35a, the adhesion between the thin-film temperature sensor 35 and the heat insulating package 34 is improved.

The diffusion prevention layer 35b is a layer for suppressing atomic diffusion between layers due to heat, and is formed of a material (for example, W) having a relatively high melting point and relatively low reactivity. By the diffusion prevention layer 35b, atomic diffusion from the adhesion layer 35a to the resistor layer 35c due to heat or atomic diffusion from the resistor layer 35c to the adhesion layer 35a due to heat is suppressed.

The resistor layer 35c is formed of a material (for example, Au) of which electrical resistance is substantially proportional to a temperature in one-to-one basis. With regard to the resistor layer 35c of the thin-film temperature sensor 35, when the resistance R(T) is expressed by the temperature T as a variable, a relationship represented by the following formula can be established. When $\alpha$ and R(273) are obtained in advance through an experiment or a simulation, the temperature can be obtained from the electrical resistance of the thin-film temperature sensor 35. The thin-film temperature sensor 35 can be used as a temperature-electricity conversion element. Here, $\alpha$ is a proportionality constant, and R(273) is an electrical resistance when the temperature is 0° C. (273K).

$$R(T)=R(273)\times(1+\alpha(T-273)) \qquad (5)$$

Figure 4:
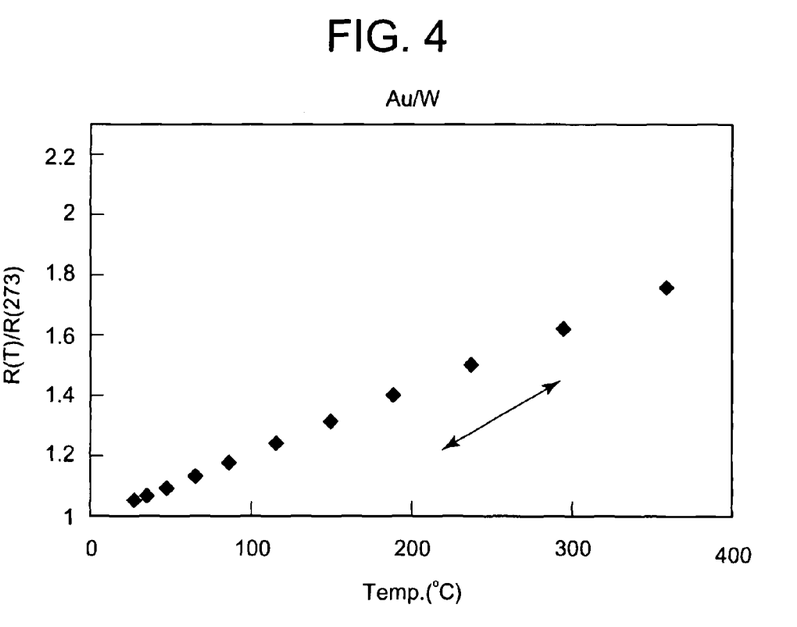
FIG. 4 is a graph showing a relationship between temperature and electrical resistance of a temperature sensor formed on the heat insulating package.

FIG. 4 is a graph showing a relationship between the temperature T and R(T)/R(273) in a case where the adhesion layer with a thickness of 50 nm formed of Ti, the diffusion prevention layer with a thickness of 50 nm formed of W, and the resistor layer with a thickness of 200 nm formed of Au, are stacked in order from below on a substrate. As apparent from FIG. 4, it is understood that the temperature T and the resistance R(T) are in a relationship of substantially direct proportion from 0° C. to 400° C. When the diffusion prevention layer is Ti or Ta with a thickness of 50 nm, a phenomenon that the electrical resistance R(T) rapidly rises occur in a temperature range exceeding 250° C., and the above-described formula (5) is no longer satisfied. This is considered to be caused since atoms of Ti or Ta were diffused into the resistor layer due to heat energy. Hence, it is desirable that the diffusion prevention layer 35b of the thin-film temperature sensor 35 be W.

W is less likely to be adhered onto the heat insulating package 34. Accordingly, when W is used as a constituent substance of the diffusion prevention layer 35b, at least one of Ta, Mo, Ti, Cr, and TiN, which are more highly reactive than W, is used as a constituent substance of the adhesion layer 35a of the thin-film temperature sensor 35.

Figure 5:
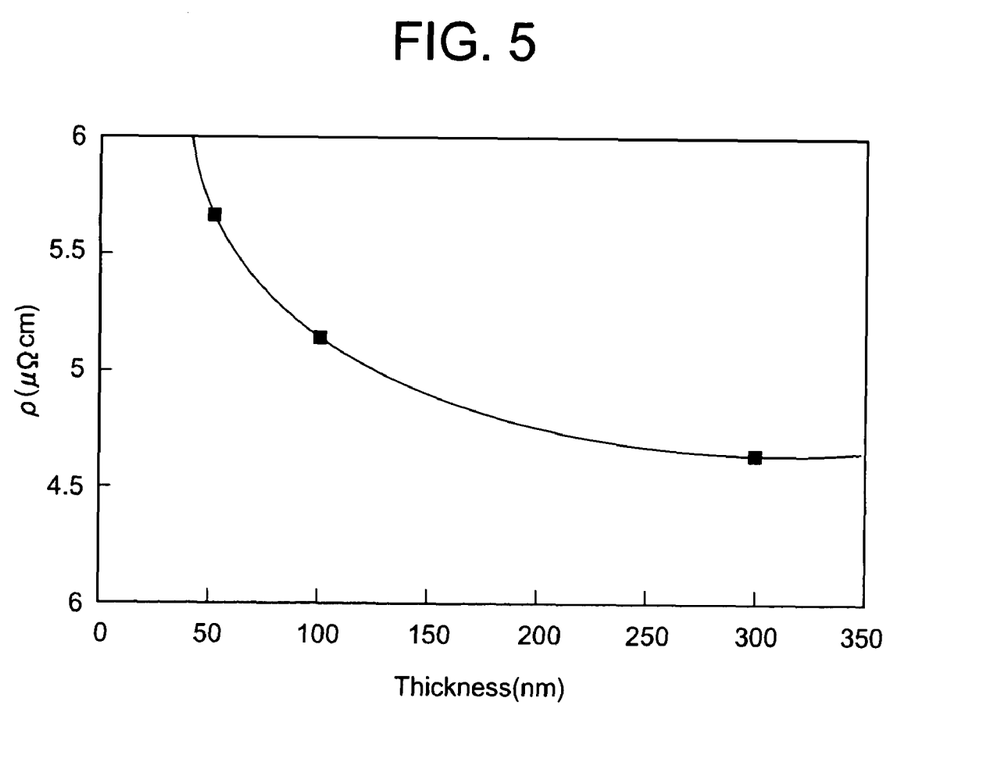
FIG. 5 is a graph showing a relationship between thickness and resistivity of a resistor layer of the temperature sensor.

FIG. 5 is a graph showing a relationship between electrical resistivity $\rho$ and a film thickness of Au under a condition where the temperature is constant. When the film thickness of Au is 50 nm, $\rho$ becomes 5.7 $\mu\Omega\cdot$cm. When the film thickness of Au is 100 nm, $\rho$ becomes 5.2 $\mu\Omega\cdot$cm. When the film thickness of Au is 300 nm, $\rho$ becomes 4.7 $\mu\Omega\cdot$cm. When the film thickness of Au exceeds 300 nm, the value of $\rho$ becomes substantially constant. Here, as the value of $\rho$ becomes small, a rate of change in $\rho$ in a case where $\rho$ is changed by a unit amount (1.0 $\mu\Omega\cdot$cm) becomes large. For example, while in a case where $\rho$ is changed by 1 $\mu\Omega\cdot$cm from 10 $\mu\Omega\cdot$cm to 11 $\mu\Omega\cdot$cm the rate of change in $\rho$ is 1.1 (=11/10), and in a case where $\rho$ is changed by 1 $\mu\Omega\cdot$cm from 3 $\mu\Omega\cdot$cm to 4 $\mu\Omega\cdot$cm the rate of change in $\rho$ is 1.33 (=4/3). Hence, when a material, whose $\rho$ is as low as possible and changes in a large rate by the change of the temperature T, is used, it becomes easy to detect the change of the electrical resistance R(T), and as a result, measurement accuracy of the temperature T can be improved. Moreover, from a result of the experiment, it has been understood that in a case where the film thickness is smaller than 100 nm, the electrical resistivity $\rho$ becomes too large, and the measurement accuracy of the temperature T is decreased. Moreover, the following has been found out. Specifically, there is an apprehension that, when the film thickness exceeds 700 nm, adhesion strength between the resistor layer 35c (Au layer) and the diffusion prevention layer 35b or the adhesion layer 35a cannot be ensured sufficiently, and a malfunction such as a crack may occur in the resistor layer 35c. From the above, it is desirable that the film thickness of the resistor layer 35c (Au layer) be set within a range of 100 to 700 nm.

It is preferable that the thickness of the diffusion prevention layer 35b of the thin-film temperature sensor 35 be set within a range of 50 to 100 nm. The reason is as follows. Specifically, when the thickness of the diffusion prevention layer 35b is less than 50 nm, it becomes difficult to form the diffusion prevention layer 35b by the vapor deposition method such as a vacuum evaporation method and a sputtering method. Moreover, even if the above-described thickness exceeds 100 nm, diffusion preventing property of the diffusion prevention layer 35b does not change at a large degree.

It is preferable that the thickness of the adhesion layer 35a of the thin-film temperature sensor 35 is set at 50 nm or more. This is because, when the thickness of the adhesion layer 35a is less than 50 nm, it becomes difficult to form the adhesion layer 35a by the by the vapor deposition method such as the vacuum evaporation method and the sputtering method.

Figure 9:
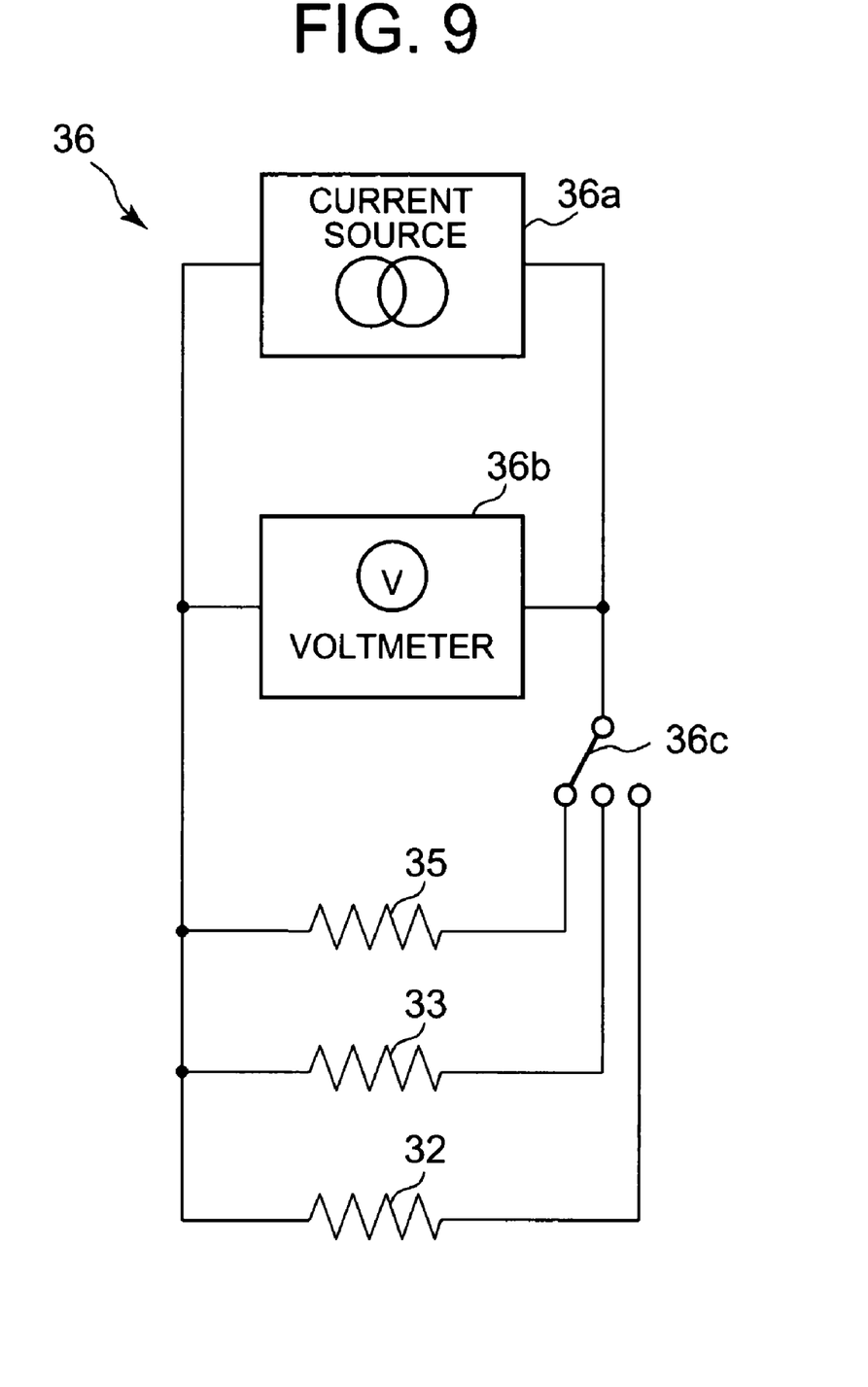
FIG. 9 is a circuit diagram showing a monitoring circuit.

As shown in FIG. 2, lead wires 35d and 35e are respectively connected to both ends of the thin-film temperature sensor 35 by resistance welding or the like, and the lead wires 35d and 35e are connected to the monitoring circuit 36 (shown in FIG. 9).

[Reaction Device Body]

As shown in FIG. 2, the reaction device body 31 is formed by stacking and bonding a substrate 50, a substrate 60, and a substrate 70 onto one another. Each of the substrates 50, 60 and 70 can be bonded to one another by anodic bonding. Note that, for the sake of convenience, the following description will be made on the assumption that the substrate 50 side is an upper side and the substrate 70 side is a lower side. Moreover, the substrate 50 is referred to as an upper substrate 50, the substrate 60 is referred to as a middle substrate 60, and the substrate 70 is referred to as a lower substrate 70.

In the present embodiment, the substrates 50, 60 and 70 are substrates made of glass, and more specifically, are glass substrates containing Na and Li which serve as mobile ions. Heat-resistant glass substrates, for example, Pyrex (registered trademark) substrates can be used as such glass substrates.

In a center portion of a bonded body of these substrates 50, 60 and 70, a space that penetrates from an upper surface of the bonded body to a lower surface thereof is disposed, and the space is referred to as a heat insulating chamber 81. Concerning a positional relationship in the perspective view of FIG. 2, a right side portion of the bonded body of the substrates 50, 60 and 70 with respect to the heat insulating chamber 81 is the high-temperature reaction portion 11, a left side thereof with respect to the heat insulating chamber 81 is the low-temperature reaction portion 12, and the high-temperature reaction portion 11 and the low-temperature reaction portion 12 are opposed to each other while sandwiching the heat insulating chamber 81 therebetween. Moreover, in the bonded body of the substrates 50, 60 and 70, a front-side portion (hereinafter, referred to as a bridge portion 82) with respect to the heat insulating chamber 81 and a rear-side portion (hereinafter, referred to as a bridge portion 83) therefrom are bridged between the high-temperature reaction portion 11 and the low-temperature reaction portion 12, and the heat insulating chamber 81 is surrounded by the high-temperature reaction portion 11, the low-temperature reaction portion 12, the bridge portion 82, and the bridge portion 83.

Among both surfaces of the upper substrate 50, on a bonded surface (lower surface) that bonds with the middle substrate 60, grooves are provided. Meanwhile, among both surfaces of the middle substrate 60, on a bonded surface (upper surface) that bonds with the upper substrate 50, grooves are provided. By bonding the upper substrate 50 and the middle substrate 60 with each other, the grooves form flow passages 51 through 56.

Figure 6:
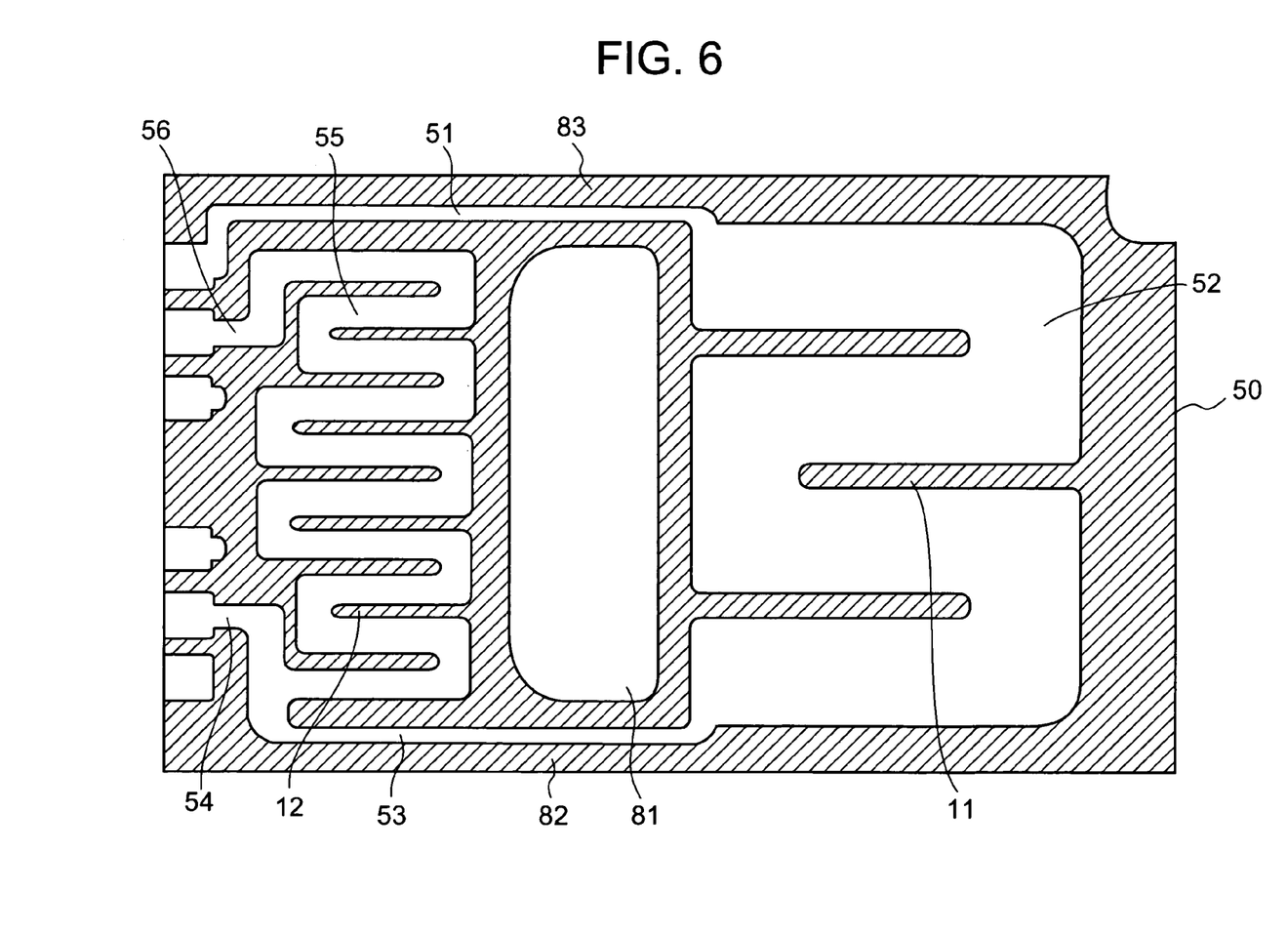
FIG. 6 is a plan cross-sectional view of an upper substrate.
Figure 7:
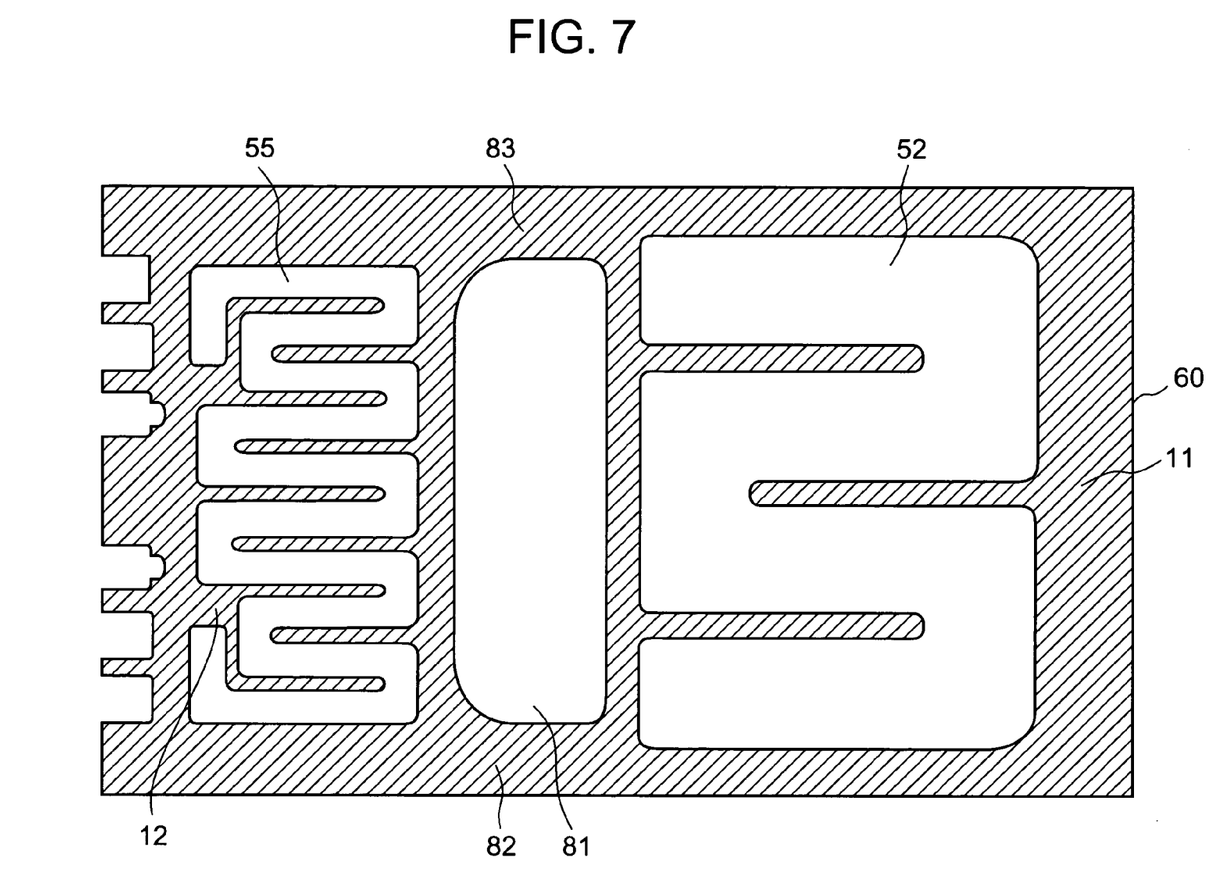
FIG. 7 is a plan cross-sectional view of a middle substrate.

Specifically, the flow passages are formed as shown in FIG. 6 and FIG. 7. FIG. 6 is a view showing a cross section of the upper substrate 50, which is parallel to the bonded surface, and FIG. 7 is a view showing a cross section of the middle substrate 60, which is parallel to the bonded surface.

In the high-temperature reaction portion 11, the flow passage 52 of the reformer 15 is formed. The grooves that are symmetrical with respect to the bonded surfaces of the upper substrate 50 and the middle substrate 60 are individually cut on the upper substrate 50 and the middle substrate 60, and the upper substrate 50 and the middle substrate 60 are bonded with each other, whereby these symmetrical grooves are overlapped with each other, and the flow passage 52 is thereby formed. In the low-temperature reaction portion 12, the flow passage 55 of the carbon monoxide remover 16 is formed. This flow passage 55 is also formed by overlapping the symmetrical grooves that are individually cut on the upper substrate 50 and the middle substrate 60 with each other.

The flow passage 51 is a flow passage that communicates from a left side surface of the reaction device body 31 through the bridge portion 83 to one end of the flow passage 52. The flow passage 51 is formed in such a manner by the groove cut on the bonded surface of the upper substrate 50 bonding the upper substrate 50 and the middle substrate 60 with each other. The flow passage 53 is a flow passage that communicates from the other end of the flow passage 53 through the bridge portion 82 to one end of the flow passage 55. The flow passage 53 is formed in such a manner by the groove cut on the bonded surface of the upper substrate 50 bonding the upper substrate 50 and the middle substrate 60 with each other. The flow passage 54 is a flow passage that communicates from the left side surface of the reaction device body 31 to one end of the flow passage 55 and joins the flow passage 55 and the flow passage 53. The flow passage 54 is formed in such a manner by the groove cut on the bonded surface of the upper substrate 50 bonding the upper substrate 50 and the middle substrate 60 with each other. The flow passage 56 is a flow passage that communicates from the other end of the flow passage 55 to the left side surface of the reaction device body 31. The flow passage 56 is formed in such a manner by the groove cut on the bonded surface of the upper substrate 50 bonding the upper substrate 50 and the middle substrate 60 with each other.

A reforming catalyst is formed on a wall surface of the flow passage 52. The reforming catalyst supports a catalytic component (for example, a Cu/ZnO catalyst when the fuel is methanol) on alumina or the like as a support.

A selective oxidation catalyst is formed on a wall surface of the flow passage 55. The selective oxidation catalyst supports a catalytic component (for example, platinum) on alumina or the like as a support.

Figure 8:
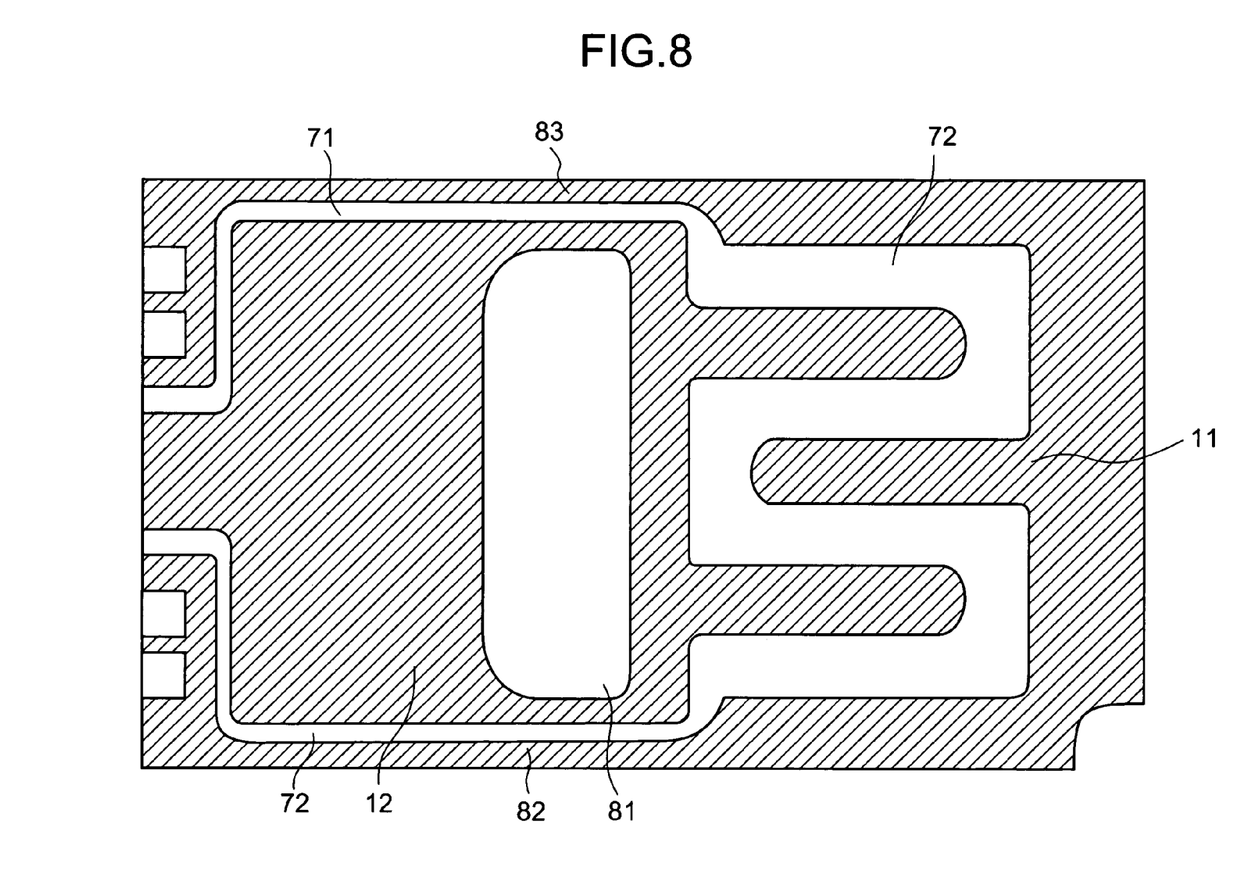
FIG. 8 is a plan cross-sectional view of a lower substrate.

FIG. 8 is a view showing a cross section of the lower substrate 70, which is parallel to the bonded surface. Concerning both surfaces of the lower substrate 70, grooves are cut on a bonded surface (upper surface) which is bonded to the middle substrate 60. By bonding the lower substrate 70 and the middle substrate 60 with each other, the grooves form flow passages 71, 72 and 73. The flow passage 72 is a flow passage of the combustor 17, and the flow passage 72 is formed into a zig-zag shape in the high-temperature reaction portion 11. The flow passage 71 is a flow passage that communicates from the left side surface of the reaction device body 31 through the bridge portion 83 to one end portion of the flow passage 72. The flow passage 73 is a flow passage that communicates from the other end portion of the flow passage 72 through the bridge portion 82 to the left side surface of the reaction device body 31.

A combustion catalyst is formed on a wall surface of the flow passage 72. The combustion catalyst supports a catalytic component (for example, platinum) on alumina or the like as a support.

As shown in FIG. 2, pipes 91 through 96 are coupled to the left side surface of the reaction device body 31. The pipe 91 is inserted into an end opening of the flow passage 51, and the gaseous mixture of the fuel and the water is introduced from the vaporizer 14 through the pipe 91 into the flow passage 51. The pipe 92 is inserted into an end opening of the flow passage 56, and the hydrogen gas and the like, that are generated in the reformer 15 and the carbon monoxide remover 16, are introduced through the pipe 92 into the fuel electrode 20 of the fuel cell type power generation cell 5. The pipe 93 is inserted into an end opening of the flow passage 71, and the off-gas from the fuel electrode 20 and the external air are mixed together, and the gaseous mixture is introduced through the pipe 93 into the flow passage 71. The pipe 94 is inserted into an end opening of the flow passage 72, and the gas of the water or the like, which is generated in the combustor 17, is discharged through the pipe 94 to the outside. The pipe 95 is inserted into an end opening of the flow passage 54, and the external air is introduced through the pipe 95 into the flow passage 54. These pipes 91 through 96 penetrate the heat insulating package 34, and are extended to the outside of the heat insulating package 34.

[Heater]

Figure 14:
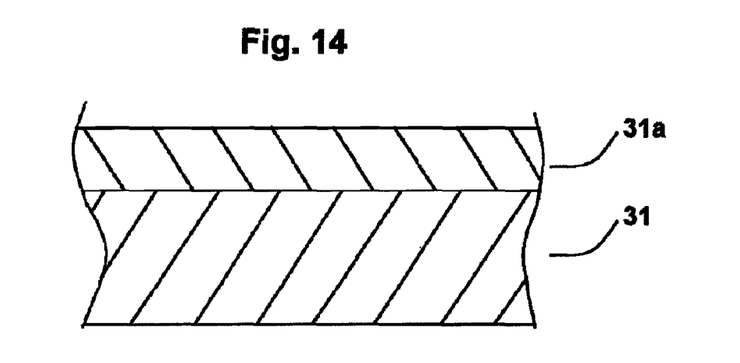
FIG. 14 conceptually illustrates an electrical insulating film on a reaction device body.

As shown in FIG. 2, concerning the surfaces of the reaction device body 31, the thin-film heater 32 is formed on an upper surface of the high-temperature reaction portion 11, and the thin-film heater 33 is formed on an upper surface of the low-temperature reaction portion 12. The thin-film heaters 32 and 33 are patterned into zig-zag shape by the vapor deposition method, the photolithography method, the etching method, and the like. Here, when the substrates 50, 60 and 70 of the reaction device body 31 have electrical conductivity, an electrically insulating film 31a is formed on the surface of the reaction device body 31 (see FIG. 14), and then the thin-film heaters 32 and 33 are formed on the electrically insulating film.

Figure 13A:
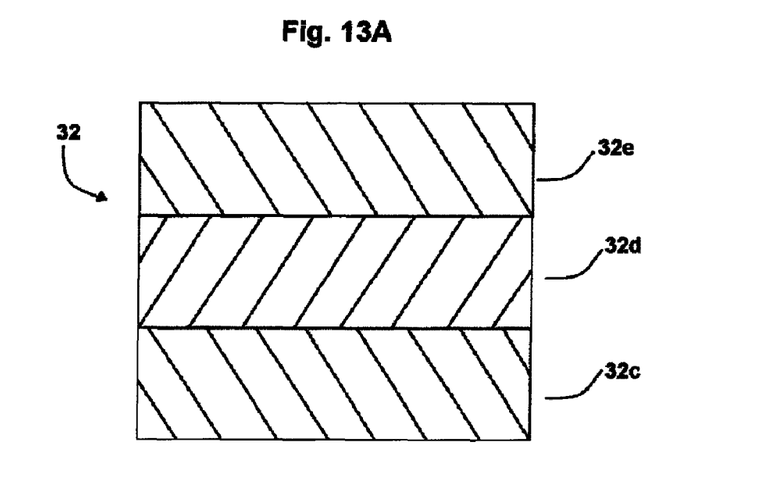
FIG. 13A conceptually illustrates the structure of a thin-film heater, and FIG. 13B conceptually illustrates the structure of another thin film heater.
Figure 13B:
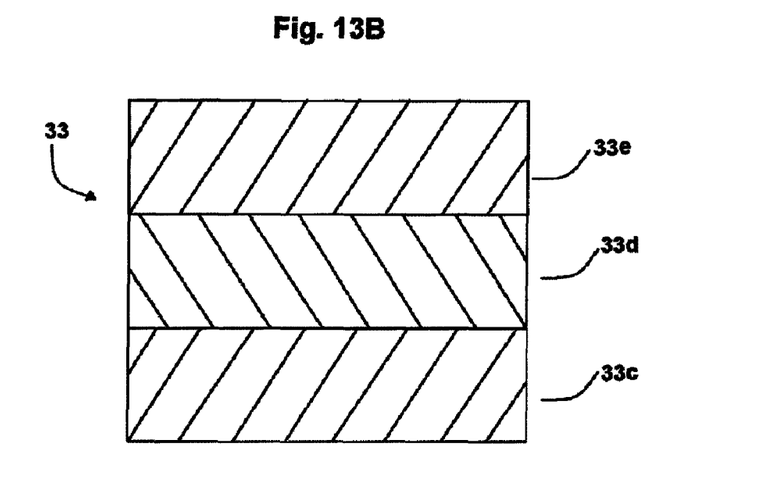

In a similar way as the thin-film temperature sensor 35 shown in FIG. 3, each of the thin-film heaters 32 and 33 is formed by stacking, in order from below, an adhesion layer 32c or 33c (second adhesion layer) (for example, at least one of Ta, Mo, Ti, Cr, and TiN), a diffusion prevention layer 32d or 33d (second diffusion prevention layer) (for example, W), and a resistor layer 32e or 33e (second resistor layer) (for example, Au) (see FIGS. 13A and 13B). Concerning the thin film heaters 32 and 33, in particular, the resistor layers 32e and 33e serve as electrothermal materials. By the adhesion layers 32c and 33c, adhesion between the thin-film heaters 32 and 33 and the reaction device body 31 is improved. By the diffusion prevention layers 32d and 33d, atomic diffusion from the adhesion layers to the resistor layers which is caused by heat or atomic diffusion from the resistor layers to the adhesion layers which is caused by heat is suppressed.

Moreover, owing to temperature-electrical resistance characteristics (the temperatures are substantially proportional to the electrical resistances) of the thin-film heaters 32 and 33, in particular, of the resistor layers, the thin-film heaters 32 and 33 serve as temperature sensors.

Lead wires 32a and 32b are respectively connected to both ends of the thin-film heater 32. The lead wires 32a and 32b penetrate the heat insulating package 34, and are extended to the outside of the heat insulating package 34. Lead wires 33a and 33b are respectively connected to both ends of the thin film heater 33. The lead wires 33a and 33b penetrate the heat insulating package 34, and are extended to the outside of the heat insulating package 34.

[Monitoring Circuit]

The lead wires 32a, 32b, 33a and 33b are connected to the monitoring circuit 36 (shown in FIG. 9). As shown in FIG. 9, the monitoring circuit 36 includes a current source 36a, a voltmeter 36b, and a switching element 36c. The current source 36a controls a current. The switching element 36c selectively connects to either one of the thin-film heaters 32, 33 or the thin-film temperature sensor 35, and selects a route through which the current of the current source 36a flows from the thin-film heaters 32, 33 and the thin-film temperature sensor 35. The voltmeter 36b measures a voltage applied to the one selected by the switching element 36c, from the thin-film heaters 32, 33 and the thin-film temperature sensor 35.

The monitoring circuit 36 monitors the electrical resistances of the thin-film heaters 32, 33 and the thin-film temperature sensor 35 based on a value of the current designated by the current source 36a and on values of the voltages measured by the voltmeter 36b. Moreover, since the electrical resistances of the thin-film heaters 32, 33 and the thin-film temperature sensor 35 are substantially proportional to the temperatures as described above, the monitoring circuit 36 simultaneously monitors the temperatures of the thin-film heaters 32, 33 and the thin-film temperature sensor 35.

Here, a pattern as the thin-film temperature sensor 35 is designed into a shape so that an inter-electrode voltage of the monitoring circuit 36 and the like shows desirable value. For example, a case of a system where an area of the surface on which the thin-film temperature sensor 35 is patterned is 12 cm$^2$, the current for monitoring the temperature of the thin-film temperature sensor 35 is 1 mA, and the temperature is going to be monitored as a voltage from 0V to 1V in the voltmeter 36b, is considered. When the film thickness of the resistor layer 35c of the thin-film temperature sensor 35 is 300 nm, the resistivity thereof is 4.7 μΩ·cm, and in this case, when the thin-film temperature sensor 35 is formed into a zig-zag shape in which a pattern width is 0.2 cm, and a pattern interval 0.04 cm, a length between both ends of the thin-film temperature sensor 35 on the entire surface with the area of 12 cm$^2$ can be set at 48 cm, and the thin-film temperature sensor 35 becomes a pattern with resistance of approximately 37 Ω. In such a way, in the case where a current of 1 mA flows, even when the voltage between both of the ends at room temperature is 0.37V, and the temperature of the heat insulating package 34 is 100° C. that can be regarded as abnormal, a function to monitor the temperature of the heat insulating package 34 can be obtained as a voltage of approximately 0.44V (=0.37× 1.2), as shown in the resistance change of FIG. 4.

[Operation of Reaction Device]

First, when the water and the fuel in the fuel container 2 are heated by the vaporizer 14 and are introduced into the pipe 91 in a state where the reaction device body 31 is heated by the thin-film heater 32 and the thin-film heater 33, the vaporized mixture of the water and the fuel is fed to the flow passage 52 of the reformer 15. When the mixture flows through the flow passage 52, hydrogen, carbon dioxide, carbon monoxide, and the like are generated (refer to the chemical reaction formulas (1) and (2) when the fuel is methanol).

The hydrogen and the like, which are generated in the flow passage 52, are fed to the flow passage 55 of the carbon monoxide remover 16. Moreover, the external air is introduced into the pipe 95 and is fed to the flow passage 55. Then, the hydrogen and the like and the air are mixed together and flow through the flow passage 55, where the carbon monoxide is preferentially oxidized and removed. Such reformed gas, from which the carbon monoxide is removed, is discharged from the pipe 92, and is supplied to the fuel electrode 20 of the fuel cell type power generation cell 5.

The off-gas such as the hydrogen gas that has remained without going under the electrochemical reaction in the fuel electrode 20 is mixed with the air, introduced into the pipe 93, and fed to the flow passage 72 of the combustor 17. Then, the mixture of the hydrogen and the like and the air flows through the flow passage 72, where the hydrogen is burned. Exhaust gas thus generated is discharged from the pipe 94.

When the fuel and the water are continuously fed to the reaction device body 31 as described above, the high-temperature reaction portion 11 and the low-temperature reaction portion 12 are heated by the combustion heat of the combustor 17. The combustion heat of the combustor 17 transfers through the bridge portion 83 and the bridge portion 82 to the low-temperature reaction portion 12, and a temperature difference occurs between the high-temperature reaction portion 11 and the low-temperature reaction portion 12. Here, the heat insulating chamber 81 is formed between the low-temperature reaction portion 12 and the high-temperature reaction portion 11, and concerning the inside of the heat insulating package 34, the degree of vacuum is set high so as to reach a desired value. Accordingly, a route of the heat transfer is limited to the bridge portion 83 and the bridge portion 82. In such way, the temperature difference between the low-temperature reaction portion 12 and the high-temperature reaction portion 11 can be increased, and the low-temperature reaction portion 12 and the high-temperature reaction portion 11 can be operated at desired temperatures. By the thin-film heater 33 and the monitoring circuit 36, it is monitored whether or not the low-temperature reaction portion 12 is operating at the desired temperature (90 to 140° C.), and by the monitoring circuit 36, it is monitored whether or not the high-temperature reaction portion 11 is operating at the desired temperature (250 to 400° C.). Moreover, by the monitoring circuit 36, it is monitored whether or not the heat insulating package 34 has reached a predetermined temperature.

As described above, in the present embodiment, the temperature of the heat insulating package 34 is monitored, thus making it possible to confirm whether or not the degree of vacuum of the heat insulating package 34 has decreased to less than the desired value. Specifically, when a gas leak occurs by breakage of the reaction device body 31, the pipes 91 through 96, and the heat insulating package 34, and the degree of vacuum of the heat insulating package 34 decreases to less than the desired value, a heat insulating effect of the heat insulating package 34 is weakened, and the heat becomes prone to transfer to the heat insulating package 34. Accordingly, the temperature of the heat insulating package 34, which is measured by the thin-film temperature sensor 35, rises. Hence, when such a measurement temperature becomes higher than the predetermined temperature, it can be confirmed that the degree of vacuum of the heat insulating package 34 has decreased to less than the desired value.

Moreover, when the temperature rises to some extent in the reaction device body 31, the temperature of the heat insulating package 34, which is measured by the thin-film temperature sensor 35, becomes higher than a predetermined usual temperature, and such a fact can be detected by the thin-film temperature sensor 35.

When the temperature of the heat insulating package 34 rises, based on such a measurement temperature by the thin-film temperature sensor 35, the reaction device 10 can be terminated, the fuel to be supplied can be adjusted, and a feedback control can be performed for the thin-film heaters 32, 33 and the combustor 17.

Moreover, the thin-film heaters 32, 33 and the thin-film temperature sensor 35 have the same stacking structures, and in addition, the thin-film heaters 32, 33 and the thin-film temperature sensor 35 have the same temperature characteristics with respect to the electrical resistances. Accordingly, the current source 36a and the voltmeter 36b can be shared with both of the thin-film temperature sensor 35 and the thin-film heaters 32 and 33. Therefore, there is a convenience that the monitoring circuit 36 can be used for both monitoring the temperatures of the thin-film heaters 32 and 33, and monitoring the temperature of the thin-film temperature sensor 35, achieving an advantage in using the reaction device 10 for a small instrument.

Second Embodiment

Figure 10:
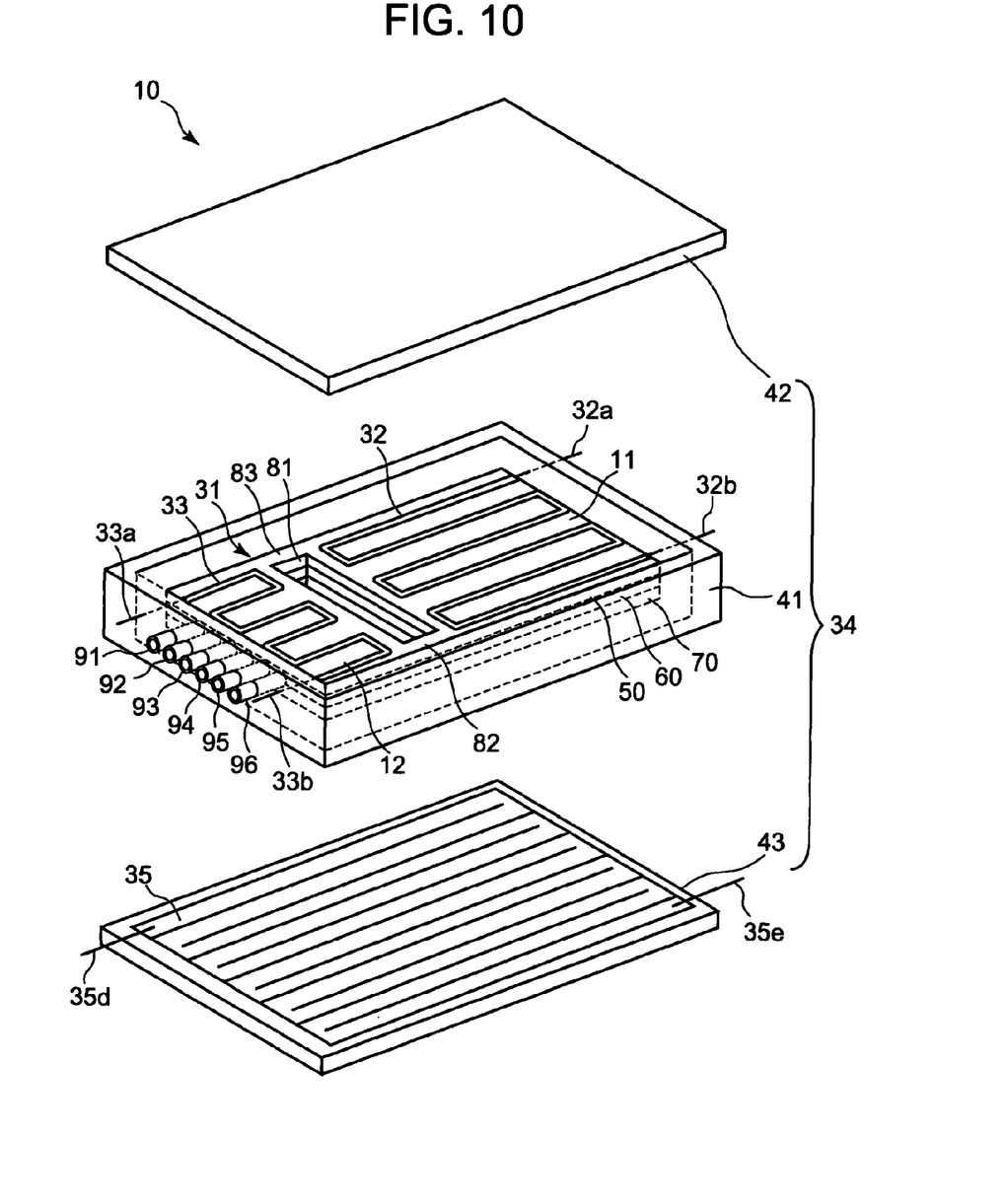
FIG. 10 is a perspective view showing a state where a reaction device according to a second embodiment of the present invention is exploded.

In the first embodiment, the thin-film temperature sensor 35 is formed on the outer surface of the heat insulating package 34. In a second embodiment, as shown in FIG. 10, the thin-film temperature sensor 35 is formed on the inner surface of the heat insulating package 34.

Figure 11:
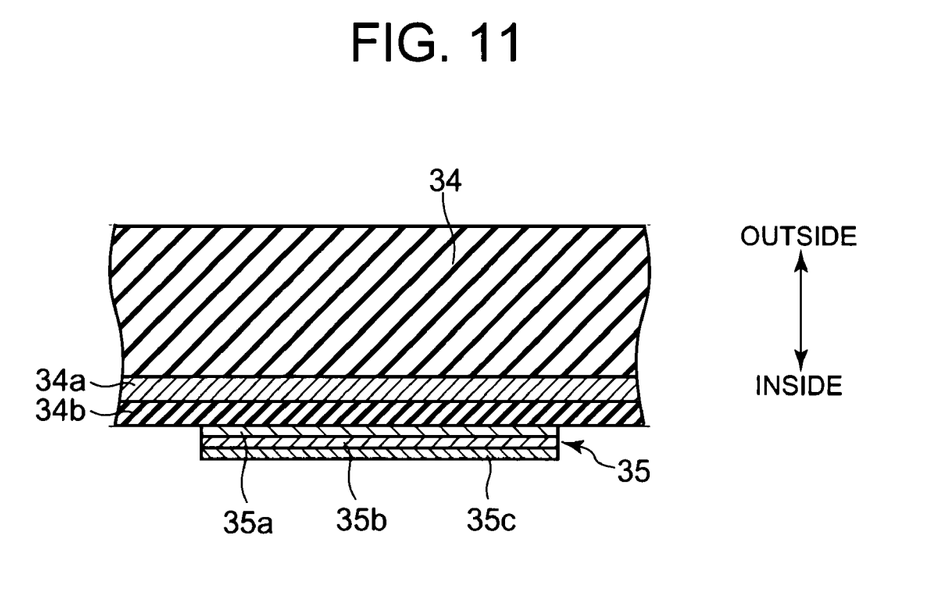
FIG. 11 is a partial cross-sectional view of a heat insulating package of the reaction device according to the second embodiment.

Here, as shown in FIG. 11, the radiation reflection film 34a is formed on the inner surface of the heat insulating package 34. When the radiation reflection film 34a is Al, Ag or Cu other than Au, an electrically insulating film 34b made of $SiO_2$ or the like is formed on the radiation reflection film 34a, and the thin-film temperature sensor 35 is patterned on the electrically insulating film 34b. When the radiation reflection film 34a is other than Au, the adhesion between the electrically insulating film 34b and the radiation reflection film 34a is enhanced, and the radiation reflection film 34a and the thin-film temperature sensor 35 can be electrically insulated from each other by the electrically insulating film 34b.

Moreover, the electrically insulating film 34b is transparent in order to reflect an infrared ray by the radiation reflection film 34a. With respect to the electrically insulating film 34b, film thickness thereof is set so as not cause multiple reflection of light with a wavelength λ of 1.5 μm or more, which is the range of infrared ray desired to be reflected by the radiation reflection film 34a. Therefore, when a refractive index n of the electrically insulating film 34b made of $SiO_2$ is set equal to 1.5, the film thickness d is required to satisfy the following formula.

$\lambda > 2dn$

Therefore, the film thickness d of the electrically insulating film 34b is required to be less than 500 nm. Absorption of the infrared ray by $SiO_2$ itself of the electrically insulating film 34b is ignorable since an absorption coefficient of molecular/atomic vibrations as a main factor of the absorption is small.

When Au, Al, Ag, or Cu is used for the resistor layer 35c of the thin-film temperature sensor 35, the resistor layer 35c itself also reflects the heat radiation. Accordingly, even if the radiation reflection film 34a is coated with the thin-film temperature sensor 35, the reflection of the heat radiation does not affect the heat insulation performance.

Figure 12:
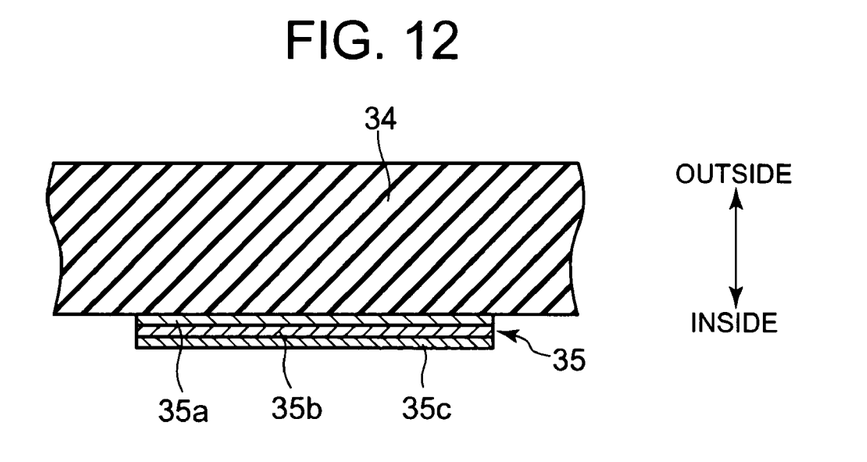
FIG. 12 is a partial cross-sectional view of the heat insulating package of the reaction device according to the second embodiment.

Meanwhile, as shown in FIG. 12, when the lid member 43 of the heat insulating package 34 is made of an electrically insulating material, and the radiation reflection film is not formed on the inner surface of the heat insulating package 34, even the electrically insulating film is not required, and the thin-film temperature sensor 35 is directly patterned on the inner surface of the heat insulating package 34. Here, the thin-film temperature sensor 35 functions as a reflection film by the resistor layer 35c thereof. Accordingly, the heat rays/electromagnetic waves emitted from the reaction device body 31 and the thin-film heaters 32 and 33 are reflected by the thin-film temperature sensor 35. Therefore, the heat loss caused by the radiation can be suppressed. Moreover, a radiation reflection film which is separate from the thin-film temperature sensor 35 is not provided, and therefore, manufacturing cost of the reaction device can be suppressed.

In order to perform the reflection made by the resistor layer 35c of the thin-film temperature sensor 35 in a range as wide as possible, the thin-film temperature sensor 35 is patterned to be left much so that the inner surface of the heat insulating package 34 cannot be exposed as much as possible. For example, the case of the system is considered, where the area of the portion on which the thin-film temperature sensor 35 is patterned is 12 $cm^2$, the current for monitoring the temperature thereof is 1 mA, and the temperature is going to be monitored as a voltage from 0V to 1V in the voltmeter 36b. Then, when the film thickness of the resistor layer 35c is 300 nm, the resistivity thereof is 4.7 μΩ·cm, and in this case, when the thin-film temperature sensor 35 is formed into the meandering shape in which the pattern width is 0.2 cm, and the pattern interval 0.04 cm, the length between both ends of the thin-film temperature sensor 35 on the entire surface with the area of 12 $cm^2$ can be set at 48 cm. In this case, ratio of an area of the thin-film temperature sensor 35 and the surface on which the thin-film temperature sensor 35 is formed, is 0.83 (=0.2/(0.2+0.04)), and the thin-film temperature sensor 35 serves as a resistor pattern with resistance of approximately 37 Ω.

Specifically, when the radiation reflection film is not formed on the inner surface of the heat insulating package 34, but the thin-film temperature sensor 35 as described above is prepared on the inner surface of the heat insulating package 34, the thin-film temperature sensor 35 can be maintained in place of the radiation reflection film for 80% or more by area. At the same time, in a case where a current of 1 mA flows, even when the voltage between both of the ends at room temperature is 0.37V, and the temperature of the heat insulating package 34 is 100° C. that can be regarded as abnormal, a function to monitor the temperature of the heat insulating package 34 can be obtained as a voltage of approximately 0.44V (=0.37×1.2) as shown in the resistance change of FIG. 4.

The reaction device of the second embodiment is configured in a similar manner as to the reaction device 10 of the first embodiment except for the above description. Accordingly, a detailed description of the reaction device of the second embodiment is omitted. Moreover, portions common between the reaction device of the second embodiment and the reaction device 10 of the first embodiment are denoted by the same reference numerals.

Also in the second embodiment, the thin-film heaters 32 and 33 and the thin-film temperature sensor 35 have the same stacking structures, and in addition, the thin-film heaters 32, 33 and the thin-film temperature sensor 35 have the same temperature characteristics with respect to the electrical resistances. Accordingly, the current source 36a and the voltmeter 36b can be shared with both of the thin-film temperature sensor 35 and the thin-film heaters 32 and 33. Therefore, as in the above-described first embodiment, there is a convenience that the monitoring circuit 36 can be used for both monitoring the temperatures of the thin-film heaters 32 and 33, and monitoring the temperature of the thin-film temperature sensor 35, achieving an advantage in using the reaction device 10 for a small instrument.

Here, that the present invention is not limited to the embodiments described above, and a variety of improvements and design modification may be made without departing from the scope of the present invention.

In the above-described embodiments, the thin-film heaters 32 and 33 are provided on the surface of the reaction device body 31. However, the following configuration may be adopted, in which the thin-film heater 32 is provided in the inside of the reaction device body 31 so as to be exposed to the flow passage 52 of the reformer 15 and the flow passage 72 of the combustor 17, and the thin-film heater 33 is provided in the inside of the reaction device body 31 so as to be exposed to the flow passage 55 of the carbon monoxide remover 16.

The entire disclosure of Japanese Patent Application No. 2006-253105, filed on Sep. 19, 2006, including specifications, claims, drawings and abstract are incorporated herein by reference in their entirety.

While a variety of typical embodiments have been shown and described, the present invention is not limited to the above-described embodiments. Therefore, the scope of the present invention is limited only by the following claims.

What is claimed is:

1. A reaction device, comprising:
a heat source;
a housing that houses the heat source therein; and
a temperature detection unit that is formed on a surface of the housing and reflects radiation; wherein the temperature detection unit comprises:
a first resistor layer, an electrical resistance which changes in accordance with temperature;
a first adhesion layer that is interposed between the first resistor layer and the surface of the housing; and that improves adhesion between the first resistor layer and the housing; and a first diffusion prevention layer that is interposed between the first adhesion layer and the first resistor layer, and that suppresses thermal diffusion between the first adhesion layer and the first resistor layer which is caused by heat.

2. The reaction device according to claim 1, further comprising a heating unit that heats the heat source.

3. The reaction device according to claim 2, wherein the heating unit comprises:

a second resistor layer, an electrical resistance of which changes in accordance with temperature;
a second adhesion layer that is interposed between the second resistor layer and the heat source, and that improves adhesion between the second resistor layer and the heat source; and
a second diffusion prevention layer that is interposed between the second adhesion layer and the second resistor layer, and that suppresses thermal diffusion between the second adhesion layer and the second resistor layer which is caused by heat.

4. The reaction device according to claim 3, wherein the first resistor layer and the second resistor layer contain a same material.

5. The reaction device according to claim 4, wherein electrical characteristic values of the first and second resistor layers are monitored by a same monitoring circuit.

6. The reaction device according to claim 5, wherein the monitoring circuit includes a current source, a voltmeter, and a switching element.

7. The reaction device according to claim 3, wherein the heat source comprises a reaction device body that generates hydrogen from fuel and water.

8. The reaction device according to claim 1, wherein an outer circumferential surface of the heat source has an electrically insulating property.

9. The reaction device according to claim 1, wherein an outer circumferential surface of the heat source has electrical conductivity, and an electrically insulating film is provided on the outer circumferential surface of the heat source.

10. The reaction device according to claim 1, wherein an outer circumferential surface of the housing has an electrically insulating property.

11. The reaction device according to claim 1, wherein an outer circumferential surface of the housing has electrical conductivity, and an electrically insulating film is provided on the outer circumferential surface of the housing.

12. The reaction device according to claim 1, further comprising a radiation reflection film formed on an inner surface of the housing.

13. The reaction device according to claim 1, wherein the heat source comprises a reaction device body that generates hydrogen from fuel and water.

14. The reaction device according to claim 1, wherein the first resistor layer includes one of Au, Al, Ag, and Cu.

15. A reaction device comprising: a heat source;
a housing that houses the heat source therein; and a temperature detection unit that is formed on a surface of the housing and reflects radiation; wherein an outer circumferential surface of the housing has electrical conductivity, and an electrically insulating film is provided on the outer circumferential surface of the housing; and wherein the temperature detection unit comprises:
a first resistor layer, an electrical resistance of which changes in accordance with temperature;
a first adhesion layer that is interposed between the first resistor layer and the electrically insulating film, and that improves adhesion between the first resistor layer and the electrically insulating film; and
a first diffusion prevention layer that is interposed between the first adhesion layer and the first resistor layer, and that suppresses thermal diffusion between the first adhesion layer and the first resistor layer which is caused by heat.

16. A reaction device a heat source;
a housing that houses the heat source therein; and a temperature detection unit that is formed on a surface of the housing and reflects radiation; a radiation reflection film formed on an inner surface of the housing; and comprising:

an electrically insulating film coated with the radiation reflection film, wherein the temperature detection unit is formed on the electrically insulating film, and wherein the temperature detection unit comprises:

a first resistor layer, an electrical resistance which changes in accordance with temperature;

a first adhesion layer that is interposed between the first resistor layer and the surface of the housing; and that improves adhesion between the first resistor layer and the housing; and a first diffusion prevention layer that is interposed between the first adhesion layer and the first resistor layer, and that suppresses thermal diffusion between the first adhesion layer and the first resistor layer which is caused by heat.

17. The reaction device according to claim 16, wherein a refractive index of the electrically insulating film n, a wavelength of an infrared ray $\lambda$, and a thickness of the electrically insulating film d satisfy the relationship of $\lambda > 2\,dn$.

* * * * *